(12) United States Patent
Doerr et al.

(10) Patent No.: US 12,469,172 B2
(45) Date of Patent: Nov. 11, 2025

(54) METHOD FOR CALIBRATING A SENSOR FOR A DRIVER ASSISTANCE SYSTEM AND CONTROL UNIT

(71) Applicant: Robert Bosch GmbH, Stuttgart (DE)

(72) Inventors: Alfons Doerr, Stuttgart (DE); Mauro Disaro, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 341 days.

(21) Appl. No.: 18/308,617

(22) Filed: Apr. 27, 2023

(65) Prior Publication Data

US 2023/0419543 A1 Dec. 28, 2023

(30) Foreign Application Priority Data

Apr. 29, 2022 (DE) ..................... 10 2022 204 240.9

(51) Int. Cl.
*G06T 7/80* (2017.01)
*G01S 7/40* (2006.01)
*G01S 7/497* (2006.01)
*G01S 7/52* (2006.01)
*G06T 7/70* (2017.01)

(52) U.S. Cl.
CPC .................. *G06T 7/80* (2017.01); *G01S 7/40* (2013.01); *G01S 7/497* (2013.01); *G01S 7/52004* (2013.01); *G06T 7/70* (2017.01); *G06T 2207/30252* (2013.01)

(58) Field of Classification Search
CPC ... G06T 7/80; G06T 7/70; G06T 2207/30252; G01S 7/40; G01S 7/497; G01S 7/52004; G01S 15/931; G01S 17/931; G01S 2013/9323; G01S 2013/9324; G01S 7/4026; G01S 7/4086; G01S 13/931
See application file for complete search history.

(56) References Cited

U.S. PATENT DOCUMENTS

| | | | |
|---|---|---|---|
| 2016/0161602 A1* | 6/2016 | Prokhorov | G01S 7/4972 702/97 |
| 2017/0061622 A1* | 3/2017 | Sakano | G06T 7/80 |
| 2017/0124781 A1* | 5/2017 | Douillard | G08G 1/207 |
| 2019/0012808 A1* | 1/2019 | Mou | G08G 1/16 |
| 2019/0094347 A1* | 3/2019 | Singh | G01S 7/4972 |

(Continued)

FOREIGN PATENT DOCUMENTS

| | | |
|---|---|---|
| DE | 102018116108 A1 | 1/2019 |
| DE | 102019220049 A1 | 6/2021 |
| DE | 102020204034 A1 | 9/2021 |

*Primary Examiner* — Molly Wilburn
(74) *Attorney, Agent, or Firm* — NORTON ROSE FULBRIGHT US LLP

(57) ABSTRACT

A method for calibrating a sensor for a driver assistance system of a vehicle. The method includes a step of outputting of a calibration signal by the sensor of the vehicle in the stationary operating state when a reference object has been placed in a position in front of the vehicle, in the step of outputting, a reference calibration value being stored, which corresponds to a calibrated state of the sensor. The method further includes a step of executing a calibration of the sensor, and/or of a further sensor in the vehicle in the stationary operating state, the calibration of the sensor and/or of a further sensor taking place using a knowledge of the position of the reference object and of the reference calibration value.

10 Claims, 4 Drawing Sheets

(56) References Cited

U.S. PATENT DOCUMENTS

2019/0204425 A1\* 7/2019 Abari .................. G01S 7/497
2020/0134872 A1\* 4/2020 Feng .................. H04N 23/661
2022/0284629 A1\* 9/2022 Cantadori ............. G01S 7/4021
2022/0319251 A1\* 10/2022 Nee .................. G01S 7/4086

\* cited by examiner

METHOD FOR CALIBRATING A SENSOR FOR A DRIVER ASSISTANCE SYSTEM AND CONTROL UNIT

FIELD

The present invention is directed to a method for calibrating a sensor for a driver assistance system and to a control unit. The present invention is also directed to a computer program.

BACKGROUND INFORMATION

Driver assistance systems such as, for example, lane-keeping assistants, emergency brake assistants require data and pieces of information about what occurs in the surroundings of the vehicle. For this reason, modern vehicles have a variety of sensors such as cameras, radar sensors and LIDAR sensors, which detect the surroundings of the vehicle. In the process, the exact linking of the surroundings data to the ego motion of the vehicle is very important in regards to the quality of the "intended functionality" and, at the same time, is a major technical challenge.

SUMMARY

A method for calibrating a sensor for a driver assistance system, a control unit which uses this method, and a corresponding computer program are provided. Advantageous refinements of and improvements on the present invention are disclosed herein.

The advantages achievable with the approach presented herein involve the creation of a method for calibrating a sensor for a driver assistance system, which is able to read out and to store a reference calibration value representing a calibrated state of the sensor, so that upon reinstallation of the sensor after a repair or an installation of a further (different, for example, also similar) sensor, this reference calibration value may be used again for the calibration of the sensor or of a further sensor and the calibration is thus not lost.

According to an example embodiment of the present invention, a method is provided for calibrating a sensor for a driver assistance system of a vehicle, the method including a step of outputting of a calibration signal by the sensor of the vehicle in the stationary operating state when a reference object has been placed in a position in front of the vehicle, a reference calibration value being stored in the step of outputting, which corresponds to a calibrated state of the sensor. The method further includes a step of executing a calibration of the sensor and/or of a further sensor in the vehicle in the stationary operating state, the calibration of the sensor and/or of a further sensor taking place using a knowledge of the position of the reference object and of the reference calibration value.

A driver assistance system may be a system for assisting the driver when driving the vehicle. There are active driver assistance systems, which actively engage, for example, in a parking process or in a lane-keeping function, and passive driver assistance systems, which assist the parking process or the lane-keeping function using acoustic signals, for example, but do not engage. A sensor may be a camera, a laser-based transceiver unit (a laser receiver), a radar-based transceiver unit (a radar receiver) and an ultrasonic-based transceiver unit. The sensor may, for example, be situated at a vehicle facing in the (main) driving direction such as a rear-view mirror or at a windshield of the vehicle. Alternatively, the sensor may also be situated at the side of the vehicle or on a rear side of the vehicle. The sensor may be designed to supply a driver assistance system with data and to thus implement a driver assistance function. The sensor may be set so that, for example, it recognizes obstacles ahead of the vehicle. After repairing the vehicle, for example, replacing the windshield at which the sensor is installed, the sensor, after previously being dismantled, may be remounted at and/or in the vehicle. After mounting, the sensor may be recalibrated with the aid of a reference object. A reference object may, for example, be a calibration panel or another object having clearly arranged and easily recognizable markers. The calibration panel may include a plurality of orientation points and/or orientation lines, on the basis of which the sensor is able to recognize its position and/or orientation and is thus able to be calibrated. A calibration may be understood to be a process that matches the relative position (calibration values) of sensor and calibration panel with one another. This relative position is stored in the sensor in the form of a reference calibration value. During the calibration, the calibration values may be detected and stored as reference calibration values and differences between the calibration values may be detected and stored. For example, after a replacement of the windshield, the reinserted sensor or a newly inserted sensor may have a position or orientation differing (even slightly) from that of the sensor installed previously at this position. Absent a renewed calibration of this sensor, this may have serious consequences for the function of the driver assistance system since, for example, obstacles ahead of the vehicle may be falsely detected, detected too late or not at all if the sensor is not recalibrated after installation. A reference calibration value may be understood to mean a calibration value, which is ascertained prior to a repair in the workshop and, for example, during normal operation of the vehicle. With the aid of the knowledge of the predetermined position of the reference object from the sensor, a calibration of the sensor may then take place, for example, in such a way that the sensor is adapted so that the reference object positioned at the position is again in a position that corresponds to the calibrated state represented by the reference calibration value.

In general, therefore, the calibration may take place in such a way that the reference object is initially placed in a particular position in front of the vehicle, this position being defined by the calibrated state of the sensor. If the positioning of this particular position is recognized by the sensor, the calibration signal is then able to be output and the reference calibration value is able to be stored. If neither the vehicle nor the reference object is moved, but the sensor is removed from the vehicle (processed/repaired) and reinstalled in the vehicle or a further sensor is installed in the vehicle, this sensor or the further sensor is now able to detect the reference object in a particular position. With a knowledge of the reference calibration value, the sensor or the further sensor may now be calibrated in such a way that the reference object is again in a particular position relative to the sensor.

The present invention may be advantageously understood to include a method for restoring a calibration of a driver assistance system after a removal or installation of vehicle sensors.

According to one specific embodiment of the present invention, the calibration signal may be output in the step of outputting when the reference object is positioned in a focus point of the expansion of the sensor as the position in front of the vehicle. A focus point of the expansion may be understood to mean an image area, from which objects appear to arise in an image provided by the sensor in a moved state of the sensor. Such a specific embodiment yields the advantage of being able to execute a very precise calibration of the sensor again at a later point in time as a result of the placement of the reference object at this position.

According to one further specific embodiment of the present invention, a plurality of calibration cycles may be carried out in the step of outputting as long as the reference object is not positioned in the focus point of the expansion of the sensor. This yields the advantage that during the ascertainment of the position of the reference object, a reliable and safe ascertainment of this optimal position is supported, which then, for example, may also be matched with calibration values recorded during the drive or with the reference calibration value, so that an erroneous positioning of the reference object when the vehicle is stationary may be avoided.

According to another specific embodiment of the present invention, the reference calibration value may be output in the step of outputting as an instantaneous calibration value, which corresponds to a calibration value of the sensor ascertained during a driving operation of the vehicle. This yields the advantage that during the driving operation, a monitoring of the function of the driver assistance system or of the sensor is usually already carried out, so that during the output of the reference calibration value, it is possible to resort to this monitoring or to the instantaneous calibration value ascertained as a result thereof.

In the step of executing, the calibration of the sensor and, in addition or alternatively, of the further sensor may further be carried out using a distance parameter and, in addition or alternatively, an alignment parameter of the sensor and/or of the further sensor with respect to a reference object. This yields the advantage that a reliable calibration of the sensor or of the further sensor is able to take place, so that the sensor or the further sensor is able to function properly following a vehicle repair.

According to one specific embodiment of the present invention, in the step of executing, the sensor and/or the further sensor may be calibrated in such a way that the reference object is positioned in a focus point of the expansion of the sensor and/or of the further sensor. This yields the advantage that the sensor is able to be reliably aligned with the reference object, so that a reliable, quick and unambiguous calibration may be carried out.

According to one specific embodiment of the present invention, a sensor and/or a further sensor designed as a camera, a laser-based transceiver unit, a radar-based transceiver unit and/or an ultrasonic-based transceiver unit may be calibrated in the step of implementing and, in addition or alternatively, in the step of executing. This yields the advantage that a sensor that is particularly relevant and sensitive for the function of a driver assistance system may be reliably calibrated.

According to one specific embodiment of the present invention, the sensor and, in addition or alternatively, the further sensor may be calibrated in the step of execution after being disabled, removed and, in addition or alternatively, after being reinstalled in the vehicle. This yields the advantage that after a repair resulting from a re-installment of the sensor or of the further sensor and after a subsequent calibration, the driver assistance system is again able to function in a reliable manner.

According to one specific embodiment of the present invention, the sensor and, in addition or alternatively, the further sensor located at the same position in the vehicle as the sensor that is calibrated in the step of implementation may be calibrated in the step of execution. This yields the advantage that it is not necessary to reinstall the previously removed sensor, but rather a new sensor may be installed and calibrated.

This method may, for example, be implemented in software or in hardware or in a mixed form of software and hardware, for example, in a control unit.

The approach presented herein further provides a control unit, which is designed to carry out, to activate or to implement the steps of a variant of a method according to the present invention presented herein in corresponding units. With this embodiment variant of the present invention in the form of a control unit as well, it is possible to quickly and efficiently achieve the object underlying the present invention.

For this purpose, the control unit may include at least one processing unit for processing signals or data, at least one memory unit for storing signals or data, at least one interface to a sensor or to an actuator for reading in sensor signals from the sensor or for outputting control signals to the actuator and/or at least one communication interface for reading in or outputting data, which are embedded in a communication protocol. The processing unit may, for example, be a signal processor, a microcontroller or the like, the memory unit capable of being a flash memory, an EEPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

A control unit in the present case may be understood to mean an electrical device which processes sensor signals and, as a function thereof, outputs control signals and/or data signals. The control unit may include an interface, which may be designed in hardware and/or in software. In a hardware design, the interfaces may, for example, be part of a so-called system ASIC, which contains a wide variety of functions of the control unit. It is also possible, however, for the interfaces to be separate, integrated circuits or to be made at least partially of discrete components. In a software design, the interfaces may be software modules, which are present, for example, on a microcontroller along with other software modules.

Another advantage is a computer program product or computer program having program code, which may be stored on a machine-readable medium or memory medium, such as a semiconductor memory, a hard disk memory or an optical memory, and which is used for carrying out, implementing and/or controlling the steps of the method according to one of the above-described specific embodiments of the present invention, in particular, when the program product or program is executed on a computer or a device.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

Figure 1:
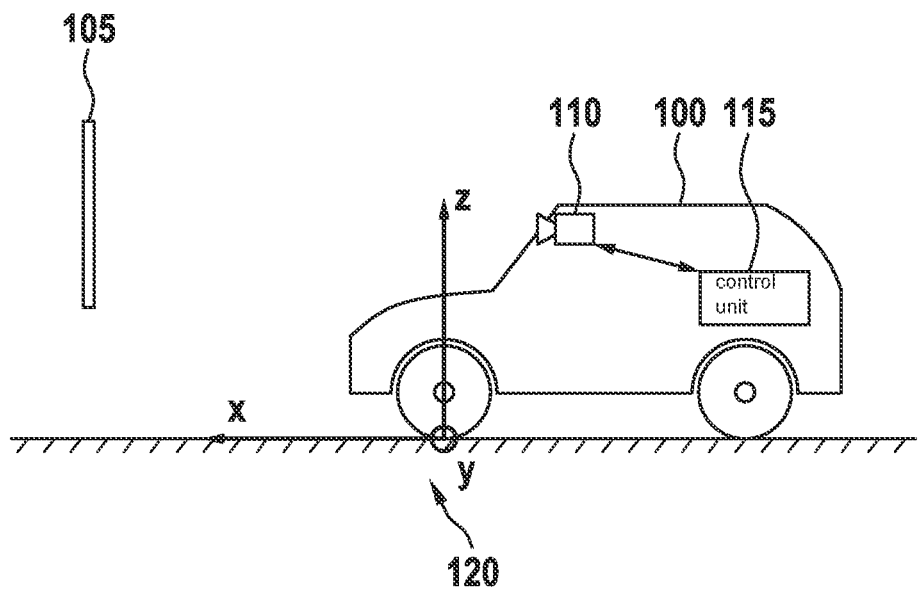
FIG. 1 shows a side view of a vehicle including one exemplary embodiment of a control unit in front of a reference object, according to the present invention.

In the following description of preferred exemplary embodiments of the present invention, identical or similar reference numerals are used for elements which are represented in the various figures and act similarly, a repeated description of these elements being omitted.

FIG. 1 shows a side view of a vehicle including one exemplary embodiment of a control unit in a vehicle 100 in front of a reference object 105. Vehicle 100 includes a sensor 100, which is situated, for example, at the height of a rearview mirror of vehicle 100. Sensor 110 in this case may be situated directly in the rearview mirror, or in a windshield of vehicle 100. Alternatively, sensor 110 may also be situated at the side of vehicle 100 or on a rear side of vehicle 100. Sensor 110 is designed, for example, as a camera. Sensor 110 may optionally be designed as a laser-based transceiver unit, as a radar-based transceiver unit, and/or as an ultrasound-based transceiver unit. Sensor 110 is designed to implement a driver assistance system.

The driver assistance system assists the driver when driving vehicle 100. There are driver assistance systems available which, for example, actively engage in a parking process or in a lane-keeping function and passive driver assistance systems, which assist the parking process, for example, using acoustic signals, but do not engage.

Sensor 110 is set in such a way that it recognizes, for example, obstacles in front of vehicle 100. If, for example, the windshield on or in which sensor 110 is situated is exchanged, sensor 110 is then also dismounted. Once a new windshield is inserted, sensor 110 is remounted. Sensor 110 may then be recalibrated with the aid of a reference object 105.

According to one exemplary embodiment, instead of sensor 110, a further sensor is mounted again in vehicle 100 after a repair.

Sensor 110 in FIG. 1 is aligned with reference object 105. Vehicle 100 further includes a control unit 115. Control unit 115 and sensor 110 are connected in a signal-transferable manner to one another. Control unit 115 is described in greater detail in FIG. 2.

Before the windshield is removed, an instantaneous calibration value of sensor 110 is read out and stored as a reference calibration value. For this purpose, reference object 105 is positioned initially in front of vehicle 100. The positioning of reference object 105 takes place in such a way that the reference object is moved into a position in front of vehicle 100, which corresponds to a focus point of the expansion. This focus (point) of the expansion represents an area from which objects appear to arise in the image sequence provided by the sensor in a moved sensor 110 or in a sensor 110 during the drive of vehicle 100. The focus point of the expansion (which is also referred to as the focus point of the expansion) thus forms a type of horizon from which objects to be monitored relevant for the drive appear during the drive of vehicle 100.

In this case, it is important that reference object 105 is positioned exactly according to the manufacturer specifications of vehicle 100 or according to feedback by sensor 110. For this purpose, reference object 105 may, for example, be positioned in front of the vehicle and it may be recognized by sensor 110 that reference object 105 is actually situated in the focus point of the expansion. Subsequently thereto, a calibration signal may be output and the calibration value bearing the calibration of the sensor may be output or stored externally of vehicle 100.

In FIG. 1, for example, an x, y, z-axis 120 is represented. The x, y, z-axis of axes of coordinates 120 represents the alignment of sensor 110 with the vehicle axis. Sensor 110 is aligned in parallel with the vehicle axis. Sensor 110 is accurately calibrated when the viewing directions of sensor 110 are correctly aligned with reference object 105 in x, y, z-axis 120, since sensor 110 is aligned in parallel with the vehicle axis. Reference object 105 is aligned exactly with the vehicle axis of vehicle 100. The exact alignment of reference object 105 with driving axis 120 is described in greater detail, in particular, in FIG. 4.

Vehicle 100 in FIG. 1 is situated in front of reference object 105. Reference object 105 includes a plurality of orientation symbols or markers. When reference object 105 is correctly positioned in front of vehicle 100, the reference calibration value of sensor 110 containing the calibration data is read out. Reference object 105 is repositioned as necessary if, for example, it is not in the focus point of the expansion. Reference object 105 is positioned in front of the vehicle prior to the removal of the windshield in such a way that, for example, it is in the focus point of the expansion.

The removal of the windshield and sensor 110, for example, takes place subsequently. With or after a reinstallation of a new windshield, either the same sensor 110 is reinstalled, or a further sensor is installed. Once sensor 110 or the further sensor is installed, a static calibration is carried out, which takes place using the reference calibration value. Vehicle 100 is subsequently transferred back to the driver. Sensor 110 or the further sensor thus has the same calibration values as prior to the repair, enabling the driver assistance system to function properly.

Figure 2:
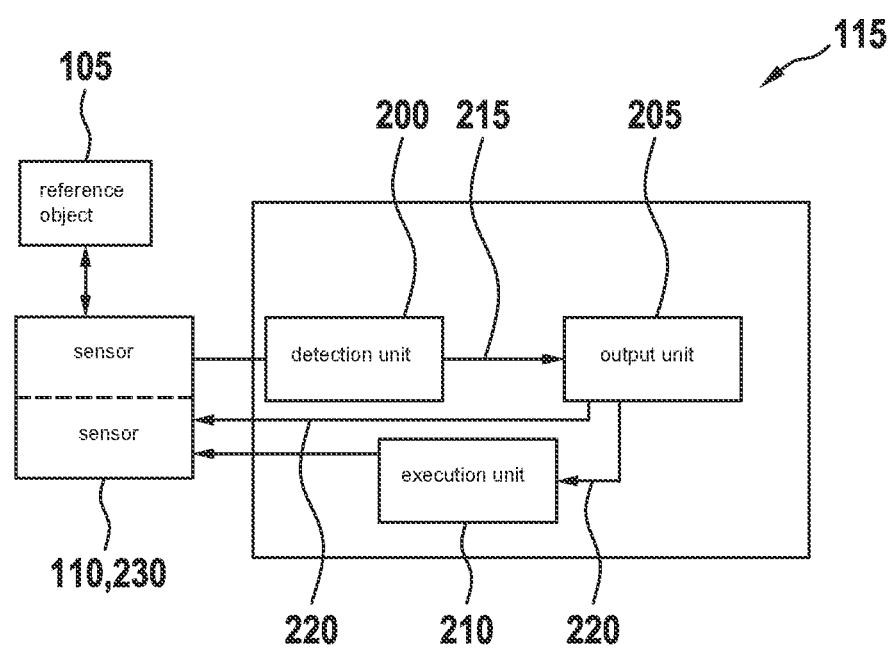
FIG. 2 shows a block diagram of one exemplary embodiment of a control unit for calibrating a sensor for a driver assistance system, according to the present invention.

FIG. 2 shows a block diagram of one exemplary embodiment of a control unit 115 for calibrating a sensor 110 for a driver assistance system. Control unit 115 is the control unit 115 mentioned in FIG. 1 or a similar control unit.

Control unit 115 includes a detection unit 200, an output unit 205 and an execution unit 210.

Detection unit 200 is designed to detect a position of reference object 105 in front of vehicle 100 and, given a correct placement of reference object 105 at a desired position, for example, at the focus point of the expansion, to emit a corresponding calibration signal 215 to output unit 205. In the output unit, a user is then signaled that reference object 105 is in a desired position, so that a further repositioning of this reference object 105 is no longer necessary.

Output unit 205 is designed to specify or to store a reference calibration value 220. Reference calibration value 220 represents a calibration of sensor 110 in the vehicle in the stationary operating state, before sensor 110 is dismounted, for example, for a repair or for a replacement of the windshield.

Execution unit 210 is designed to recalibrate sensor 110 and/or a further sensor using the reference calibration value, for example, after a replacement of the windshield. This thus enables a calibration of sensor 110 and/or of a further sensor 230 in the vehicle in the stationary operating state, once sensor 110 has been reinstalled or has been replaced by a further sensor 230. The calibration of sensor 110 and/or of further sensor 230 is carried out using distance parameter 235 and/or alignment parameter 240 with respect to reference object 105.

In execution unit 210, sensor 110 and/or further sensor 230 is/are calibrated after being disabled and/or after being reinstalled in the vehicle; sensor 110 to be calibrated and/or further sensor 230 being situated in this case at the same position in the vehicle as sensor 230 previously calibrated in implementation unit 205.

Figure 3:
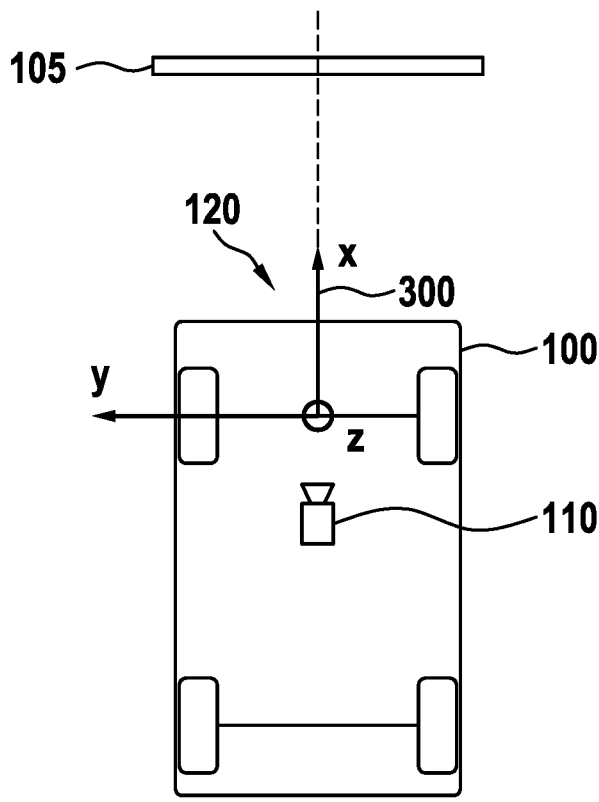
FIG. 3 shows a top view of a vehicle including a sensor in front of a reference object for explaining the approach for a variant of a calibration presented herein, according to the present invention.

FIG. 3 shows a top view of a vehicle 100 including a sensor in front of a reference object 105 for explaining the approach for a variant of a calibration presented herein. This involves vehicle 100 described in FIG. 1 or a similar vehicle. X-axis 300 of x, y, z-axis 120 in FIG. 3 extends centrically relative to reference object 105.

Figure 4:
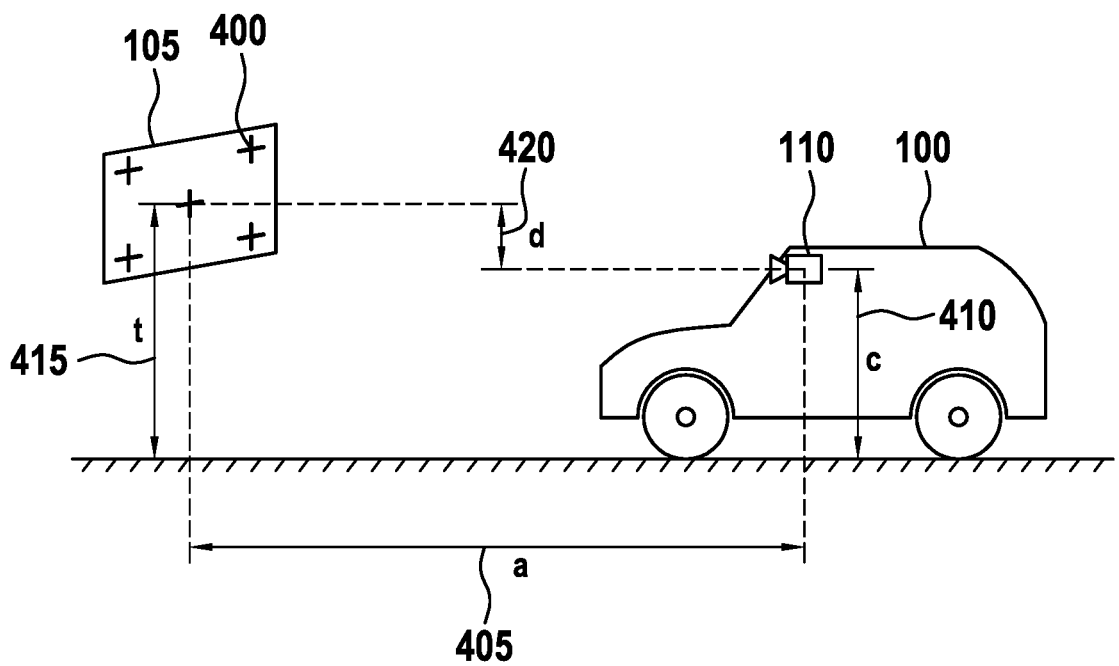
FIG. 4 shows a side view of a vehicle including a sensor in front of a reference object for explaining the approach for a variant of a calibration presented herein, according to the present invention.

FIG. 4 shows a side view of a vehicle 100 including a sensor 110 in front of a reference object 105 for explaining the approach for a variant of a calibration presented herein. This involves vehicle 100 described in FIG. 1 and FIG. 2 or a similar vehicle. A plurality of orientation symbols 400 are shown on reference object 105 in FIG. 4. With the aid of orientation symbols 400 of the markers, it is possible to correctly position reference object 105 relative to vehicle 100. Reference object 105 is aligned exactly with the vehicle axis of vehicle 100. The exact alignment of reference object 105 with driving axis 120 is important in order to ascertain and/or to store the reference calibration value. Reference object 105 is positioned in front of vehicle 100 according to manufacturer specification or its position is monitored by sensor 110 itself, a corresponding calibration signal being output when the reference object is located at a desired position. Sensor 110 subsequently detects orientation symbols 400 and matches them with the data stored in sensor 110. The exact alignment of reference object 105 is accordingly ascertained.

A value a 405 represents the distance between a central orientation symbol and sensor 110. A value c 410 represents a height at which sensor 110 is situated, measured from a ground on which vehicle 100 stands. A value t 415 represents a height at which the center orientation symbol is situated, measured also from a ground on which reference object 105 stands. A value d 420 represents a difference between the two values 410, 415.

Figure 5:
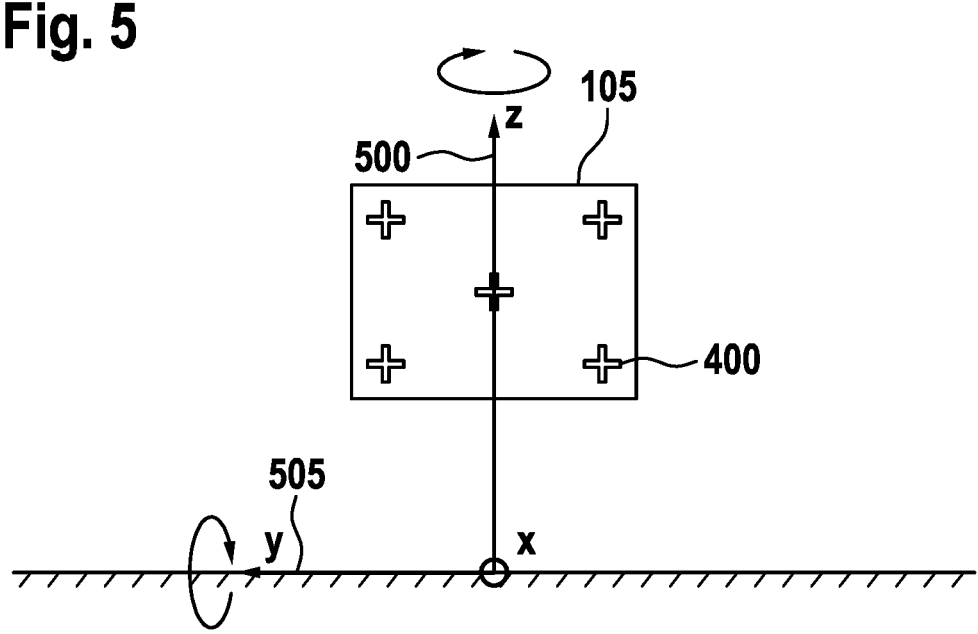
FIG. 5 shows a view of a reference object for use in one approach for a variant of a calibration presented herein, according to the present invention.

FIG. 5 shows a view of a reference object 105 for use in an approach for a variant of a calibration presented herein. Reference object 105 includes a plurality of orientation symbols 400. FIG. 5 shows which axes of the x-y-z axis of axes of coordinates 120 are adapted so that reference object 105 is aligned exactly with the vehicle axis and thus with the sensor. Z-axis 500 represents a yaw angle, a rotation about z-axis 500; y-axis 505 represents a pitch angle, a rotation about y-axis 505.

Figure 6:
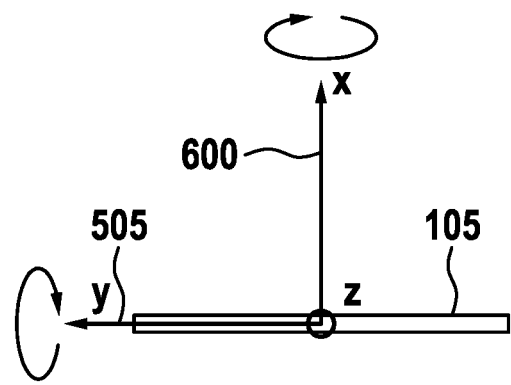
FIG. 6 shows a top view of a reference object for use in one approach for a variant of a calibration presented herein, according to the present invention.

FIG. 6 shows a top view of a reference object 105 for use in an approach for a variant of a calibration presented herein. This involves the reference object described in FIG. 5 or a similar reference object. FIG. 6 shows which axes of the x-y-z axis of axes of coordinates 120 are adapted so that reference object 105 is aligned exactly with the vehicle axis and thus with the sensor. X-axis 600 represents a roll angle, a rotation about x-axis 600 extending in the longitudinal direction of the vehicle.

In summary, the above-mentioned exemplary embodiments are briefly explained below with reference to the figures described above.

To activate driver assistance systems, the associated vehicle sensors are calibrated during installation in vehicle 100. For this process, the relative position and orientation of the driving axis and of the vehicle body per sensor with respect to the instantaneous position and orientation of sensor 110 are known. The sufficiently exact detection of these values is associated with a highly technical effort and is generally possible only at the end of the vehicle production. The data necessary for the calibration are often only estimated in the workshop using calibration devices common today, which may be referred to as a static calibration or are entered as part of a complex calibration run, which may be referred to as dynamic calibration. Depending on the quality of the calibration process carried out manually for the most part, driver assistance functions are available only to a limited extent or not at all after the vehicle repair. The sensors of the driver assistance systems are installed generally at exterior vehicle components such as the windshield or the vehicle body and are removed and reinstalled during a variety of typical vehicle repair works such as, for example, windshield replacement, painting bumpers. The calibration data are lost in the process. In general, the "online" calibration compensates for the errors in the static or dynamic calibration during normal driving operation and restores as far as possible a comprehensive driver assistance function according to a variable driving distance.

The approach presented herein describes a method with which the data essential for the calibration may be stored prior to the removal of sensor 110 from vehicle 100, and after re-installment of sensor 110 or of a further sensor 230, which may also be referred to as a new sensor, may be provided to the sensor with sufficient accuracy. This ensures that the driver assistance function is available again immediately after the vehicle is started. This is an important criterion, in particular, for vehicles above SAE Level 3. For this method, however, the driver assistance system should be sufficiently operational prior to the removal of sensor 110.

In order for the driver assistance systems in vehicle 100 to be able to use the data of sensors 110 installed in vehicle 100, the position and the orientation of sensors 110 relative to the vehicle coordinates of suspension and chassis, to the vehicle body, are known. The process for matching the coordinate systems of driver assistance sensors with vehicle 100 is referred to as calibration. This calibration may take place during the driving operation, i.e., dynamically, or when stationary, i.e., statically. Since the dynamic calibration is time-consuming and barely reproducible, the calibration that takes place as part of vehicle repairs is increasingly static.

The numerical values of the relative position of vehicle axis and vehicle body are programmed into sensor 110 as part of the calibration with the aid of a diagnostic tool. Parts of these pieces of information are provided by vehicle 100, other parts are measured manually, for example, the height of the wheel housing above the ground. The assignment of the orientations takes place with the aid of a reference object 105, which may also be referred to as a target. A reference object 105 may, for example, be an image board, a radar reflector or a LIDAR reflector. For this purpose, the sensor-specific reference object 105 is positioned in the vehicle surroundings with high 6D accuracy, i.e., 3D position+3D orientation, relative to a vehicle reference point, generally the center of the rear axle above the ground. Once this takes place, a calibration function integrated in sensor 110, which calculates the required orientation values and stores them in sensor 110, is started with the aid of a vehicle diagnostic tool.

A variety of tools are available in the workshop for professionally positioning reference object 105. These include, in general, laser-based or camera-based measuring methods. The calibration process includes multiple manual work steps, which directly influence the quality of the static calibration and, thus, the subsequent availability and performance of the driver assistance functions. Presently, a variety of criteria relating to vehicle conditioning and workshop area, i.e., load, tank capacity, lighting conditions, levelness of the floor, etc. are taken into consideration, so that in general the data for the calibration are only able to be estimated. In addition, the worker also receives no direct feedback about the quality of the calibration he/she has carried out, which fundamentally hinders an increasing improvement or monitoring of the work quality. However, the workshop is responsible for a correctly implemented calibration within the scope of the service contract entered into with the driver, if damage subsequently occurs as a result of a limited driver assistance function. A sufficiently accurate calibration of the sensors in the vehicle system currently takes place generally only at the end of the vehicle production. Adaptations of the calibration due to varying load, tire change, minor collisions take place generally via a continuous "online calibration" during daily driving operation. The continuous "online calibration" is also used to compensate for the lack of accuracy in the static calibration in the workshop. Since the "online calibration" during normal driving operation is less dynamic, the "online calibration" following a static calibration is structured more flexibly in some cases for a defined driving distance, so that the availability and performance are restored as rapidly as possible. In this phase, however, the risks of a malfunction of the driver assistance are also increased.

The basic concept of the approach presented herein is to maintain the calibration of a functioning driver assistance system even during a vehicle repair measure, even if sensors 110 of the driver assistance system are removed and installed for this purpose. For this purpose, reference objects 105 are positioned in accordance with the data stored in sensor 110 already prior to the removal of sensor 110. Sensor 110 is subsequently removed and the vehicle repair is carried out. During the repair, reference objects 105 and vehicle 100 are not moved. Once sensor 110 is installed, the calibration and thus the re-programming of sensor 110 take place based on previously positioned reference object 105.

Multiple work steps are omitted as a result of the approach presented herein: the exact calibration values are not lost and, with respect to the driver assistance functions, vehicle 100 is returned to the driver after the repair in the same state in which he/she delivered it. Using the stored calibration values, the workshop verifies that the original state is restored. The driver assistance function in its previous form is immediately available again.

One aspect for applying the approach presented herein may be considered to be that the values stored in sensor 110 are read from the calibration using a diagnostic tool. At the end of the static calibration, the position data and orientation data of sensor 110 relative to the vehicle system are stored in sensor 110. The orientation data, i.e., pitch angle, yaw angle and roll angle as they are represented, for example, in FIG. 4, are also continually corrected during the driving operation with the aid of an online calibration and also stored in sensor 110 at the end of the drive. The calibration is thus able to be continually improved over long driving distances. With the aid of a diagnostic tool, the orientation data at the end of the static calibration, as well as the orientation data of the continuous online calibration are generally read out with high resolution.

In contrast to the current approach, a static input calculation is already carried out in the approach presented herein upon vehicle reception. In this case, the distance specifications of the manufacturer with respect to vehicle 100 to reference object 105 are maintained. An exact lateral positioning of reference object 105 according to manufacturer specifications is not necessary. Prior to the calibration, the instantaneous calibration values are read out and stored with the aid of a diagnostic tool as reference calibration value 220 of sensor 110. After the input calibration, the calibration values newly provided by sensor 110 are also read out and stored. These calibration values are referred to as reference calibration value 220. A target reference object position, i.e., pitch angle and yaw angle and a "target reference object orientation," i.e. roll angle, are calculated from the difference between the instantaneous calibration values and reference calibration values 220 before and after the calibration with the aid of a predefined algorithm. A central characteristic of the target reference object position including target reference object orientation is that a static calibration provides calibration values very similar to the previously stored values of the online calibration. Alternatively, it is possible to carry out static input calculations at three or more different reference object positions and to directly calculate from the results the target reference object position using standard mathematical methods. The target reference object orientation may be read already from the input calculation. Sensor 110 is subsequently removed from vehicle 100 and reinstalled as part of a servicing measure or repair measure. However, vehicle 100 is not moved during the servicing measure or repair measure. Reference object 105 is moved into the previously calculated target reference object position including the target reference object orientation and is then no longer changed. Installed sensor 110, 230 does not have to be identical to previously removed sensor 110.

If the servicing measure or repair measure on vehicle 100 is completed, sensor 110, 230 is fully installed into vehicle 100 and reference object 105 is positioned at the target reference object position with the target reference object orientation, then the calibration function integrated in sensor 110, 230 is started with the aid of a vehicle diagnostic tool. After a successful run-through of the calibration function, which normally lasts only a few seconds, the driver assistance function is restored to 100%. An unsuccessful run-through means that sensor 110, 230 has been potentially incorrectly installed. In that case, the installation position must be corrected and the calibration function in sensor 110, 230 must be restarted until a successful calibration is achieved.

One variant of the approach presented herein is to determine experimentally the target reference position, i.e., the pitch angle and yaw angle and the target reference object orientation, i.e., the roll angle, as part of an iterative sequence of static calibration and change of the reference object position using a mathematical optimization method. For this purpose, the use of a motorized reference object holder is advantageous. When using the motorized reference object holder, reference object 105 may be removed during the vehicle repair, for example, during painting, and for carrying out the calibration, to again be motor driven to the previously determined target reference object position/orientation. As an alternative, a best possible positioning of reference object 105 in all spatial directions and spatial angles may also be carried out during the static input calculation according to manufacturer specification. In that case, the existing calibration is checked for plausibility upon vehicle reception and, if necessary, the existing calibration is rejected and replaced by a new calibration. By evaluating further vehicle data at the diagnostic interface, the difference between existing calibration data before and after the calibration will serve, upon reception of the vehicle, as a data basis for the modeling of an optimal calibration including all available vehicle data.

In summary, the approach presented herein may be described as follows:

After reception of the vehicle, the instantaneous calibration value of sensor 110 is read out and stored. The instantaneous calibration value is a calibration value from the online calibration during the driving operation. Reference object 105 is subsequently positioned relative to vehicle 100 according to manufacturer specification. In a subsequent step, a static calibration is carried out. In the static calibration, reference calibration value 220 of sensor 110 is read out and stored. The position of reference object 105 is subsequently adapted in such a way that reference calibration value 220 corresponds to the values at the reception of the vehicle. In a subsequent step, sensor 110 is removed as part of the vehicle servicing or the repair measure. After the vehicle servicing or repair measure, sensor 110 is installed and activated. Instead of sensor 110, a further sensor 230 may be installed. In a final step, a static calibration is carried out and vehicle 100 is delivered to the driver.

The approach presented herein is demonstrable according to one exemplary embodiment as follows: an input calibration is carried out prior to the removal of sensor 110 in connection with the positioning of reference object 105 for the output calibration after the reinstallation of sensor 110. A movement of vehicle 100 between the input calibration and the output calibration renders the method unusable.

Figure 7:
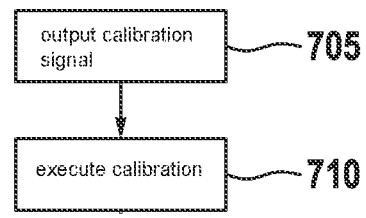
FIG. 7 shows a flowchart of one exemplary embodiment of a method for calibrating a sensor for a driver assistance system, according to the present invention.

FIG. 7 shows a flowchart of one exemplary embodiment of a method 700 for calibrating a sensor for a driver assistance system. Method 700 includes a step 705 of outputting of a calibration signal by the sensor of the vehicle in the stationary operating state when a reference object has been placed in a desired or predefined position in front of the vehicle, a reference calibration value being stored in step 705 of outputting, which corresponds to a calibrated state of the sensor. Method 700 further includes a step 710 of executing a calibration of the sensor and/or of a further sensor in the vehicle in the stationary operating state, the calibration of the sensor and/or of the further sensor taking place using a knowledge of the position of the reference object and of the reference calibration value.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for calibrating a sensor for a driver assistance system of a vehicle, the method comprising the following steps:
   outputting a calibration signal by the sensor of the vehicle in a stationary operating state when a reference object has been placed in a position in front of the vehicle, a reference calibration value being stored in the step of outputting, the reference calibration corresponding to a calibrated state of the sensor; and
   executing a calibration of the sensor and/or of a further sensor in the vehicle in the stationary operating state, the calibration of the sensor and/or of a further sensor taking place using a knowledge of a position of the reference object and of the reference calibration value,
   wherein in the step of executing, the sensor and/or the further sensor is calibrated after being disabled and/or after being removed and/or after being reinstalled in the vehicle.

2. The method as recited in claim 1, wherein in the step of outputting, the reference calibration value is output as an instantaneous calibration value, which corresponds to a calibration value of the sensor ascertained during a driving operation of the vehicle.

3. The method as recited in claim 1, wherein in the step of executing, the calibration of the sensor and/or of the further sensor is carried out using a distance parameter and/or an alignment parameter of the sensor and/or of the further sensor, with respect to the reference object.

4. The method as recited in claim 1, wherein: i) in the step of outputting, the reference calibration value is output by a sensor which is a camera and/or a laser-based transceiver unit and/or a radar-based transceiver unit and/or an ultrasonic-based transceiver unit, and/or ii) in the step of executing, a sensor, which is a camera and/or a laser-based transceiver unit and/or a radar-based transceiver unit and/or an ultrasonic-based transceiver unit, and/or the further sensor is calibrated.

5. The method as recited in claim 1, wherein in the step of executing, the sensor and/or the further sensor is calibrated, which is located at a position in the vehicle identical to that of the sensor that is in the calibrated state in the step of outputting.

6. A method for calibrating a sensor for a driver assistance system of a vehicle, the method comprising the following steps:
   outputting a calibration signal by the sensor of the vehicle in a stationary operating state when a reference object has been placed in a position in front of the vehicle, a reference calibration value being stored in the step of outputting, the reference calibration corresponding to a calibrated state of the sensor; and
   executing a calibration of the sensor and/or of a further sensor in the vehicle in the stationary operating state, the calibration of the sensor and/or of a further sensor taking place using a knowledge of a position of the reference object and of the reference calibration value,
   wherein in the step of outputting, the calibration signal is output when the reference object is positioned in a focus point of expansion of the sensor as the position in front of the vehicle.

7. The method as recited in claim 6, wherein, in the step of outputting, a plurality of calibration cycles are carried out as long as the reference object is not positioned in the focus point of the expansion of the sensor.

8. A method for calibrating a sensor for a driver assistance system of a vehicle, the method comprising the following steps:
outputting a calibration signal by the sensor of the vehicle in a stationary operating state when a reference object has been placed in a position in front of the vehicle, a reference calibration value being stored in the step of outputting, the reference calibration corresponding to a calibrated state of the sensor; and
executing a calibration of the sensor and/or of a further sensor in the vehicle in the stationary operating state, the calibration of the sensor and/or of a further sensor taking place using a knowledge of a position of the reference object and of the reference calibration value,
wherein in the step of executing, the calibration of the sensor and/or of the further sensor is carried out using a distance parameter and/or an alignment parameter of the sensor and/or of the further sensor, with respect to the reference object, and
wherein in the step of executing, the sensor and/or the further sensor is calibrated in such a way that the reference object is positioned in a focus point of expansion of the sensor and/or of the further sensor.

9. A control unit configured to calibrate a sensor for a driver assistance system of a vehicle, the control unit configured to carry out and/or activate the following steps:
outputting a calibration signal by the sensor of the vehicle in a stationary operating state when a reference object has been placed in a position in front of the vehicle, a reference calibration value being stored in the step of outputting, the reference calibration corresponding to a calibrated state of the sensor; and
executing a calibration of the sensor and/or of a further sensor in the vehicle in the stationary operating state, the calibration of the sensor and/or of a further sensor taking place using a knowledge of a position of the reference object and of the reference calibration value,
wherein in the step of executing, the sensor and/or the further sensor is calibrated after being disabled and/or after being removed and/or after being reinstalled in the vehicle.

10. A non-transitory machine-readable memory medium on which is stored a computer program for calibrating a sensor for a driver assistance system of a vehicle, the computer program, when executed by a computer, causing the computer to carry out and/or activate the following steps:
outputting a calibration signal by the sensor of the vehicle in a stationary operating state when a reference object has been placed in a position in front of the vehicle, a reference calibration value being stored in the step of outputting, the reference calibration corresponding to a calibrated state of the sensor; and
executing a calibration of the sensor and/or of a further sensor in the vehicle in the stationary operating state, the calibration of the sensor and/or of a further sensor taking place using a knowledge of a position of the reference object and of the reference calibration value,
wherein in the step of executing, the sensor and/or the further sensor is calibrated after being disabled and/or after being removed and/or after being reinstalled in the vehicle.

* * * * *